(12) United States Patent
Bloebaum et al.

(10) Patent No.: US 8,102,810 B2
(45) Date of Patent: Jan. 24, 2012

(54) ADAPTIVELY SELECTING SIGNAL CONSTELLATIONS FOR MULTI-CARRIER EDGE

(75) Inventors: Leland Scott Bloebaum, Cary, NC (US); William O. Camp, Jr., Chapel Hill, NC (US); Toby John Bowen, Durham, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 706 days.

(21) Appl. No.: 12/210,507

(22) Filed: Sep. 15, 2008

(65) Prior Publication Data

US 2010/0069022 A1 Mar. 18, 2010

(51) Int. Cl.
*H04W 72/04* (2009.01)
(52) U.S. Cl. .......................... 370/330; 370/436; 370/478
(58) Field of Classification Search .................. 370/206, 370/207, 343, 344, 330, 337, 436, 478
See application file for complete search history.

(56) References Cited

U.S. PATENT DOCUMENTS

| | | | |
|---|---|---|---|
| 6,925,067 B2 * | 8/2005 | Jou | 370/329 |
| 7,151,804 B2 * | 12/2006 | Tong et al. | 375/260 |
| 2004/0116152 A1 * | 6/2004 | Noori et al. | 455/552.1 |
| 2005/0053169 A1 * | 3/2005 | Jia et al. | 375/267 |
| 2007/0082633 A1 * | 4/2007 | Carbone et al. | 455/166.2 |
| 2007/0211829 A1 * | 9/2007 | Liang et al. | 375/320 |

FOREIGN PATENT DOCUMENTS

| | | |
|---|---|---|
| EP | 1469648 A | 10/2004 |
| WO | 03019791 A | 3/2003 |
| WO | 04002100 A | 12/2003 |

OTHER PUBLICATIONS

Annex to Form PCT/ISA/206 Communication Relating to the Results of the Partial International Search mail May 26, 2009 re International Application No. PCT/US2008/083724.
Anonymous, ETSI TR 145 912 V 7.2.0; Digital cellular telecommunications system (Phase 2+); Feasibility study for evolved GSM/EDGE Radio Access Network (GERAN); 3GPP TR 45.912 version 7.2.0 Release 7; 3rd Generation Partner Project, Jun. 1, 2007, pp. 62-112.
R.C.V. Macario, Modern Personal Radio Systems, Jan. 1, 1996, IEE, London, UK.

(Continued)

*Primary Examiner* — Brian Nguyen
(74) *Attorney, Agent, or Firm* — Coats & Bennett, P.L.L.C.

(57) ABSTRACT

The wireless communication device and corresponding method described herein selectively switches between a single-frequency mode, such as appropriate for an EDGE network, and a multiple-frequency mode, such as appropriate for a multi-carrier EDGE network. Accordingly, a transmitting wireless communication device selectively switches between a single-channel mapping unit, used during the single-frequency mode, and a multi-channel mapping unit, used during the multiple-frequency mode. The multi-channel mapping unit modulates input data to output a modulated data stream for each of multiple adjacent frequency channels that, when combined, produce a multiple-frequency signal with reduced peak-to-average ratio. A receiving wireless communication device selectively switches between a single-channel demodulator, used during the single-frequency mode, and a multi-channel demodulator, used during the multiple-frequency mode.

28 Claims, 5 Drawing Sheets

OTHER PUBLICATIONS

Annex to Form PCT/ISA/206 Communication Relating to the Results of the Partial International Search mailed Jun. 23, 2009 for International Application No. PCT/US2008/083512 filed Nov. 14, 2008.
Bloebaum, L. Scott, "Transform Techniques for Reducing the Peak Power in Orthogonal Frequency-Division Multiplexed System," A dissertation submitted to the Graduate Faculty of North Carolina State University in partial fulfillment of the requirements for the Degree of Doctor of Philosophy, Electrical Engineering, Raleigh, 1998, 142 pages.
Jouka Vankka: "Digital Synthesizers and Transmitters for Software Radio" Jan. 1, 2005, Springer, Netherlands, pp. 219-219.
Invitation to Restrict or Pay Additional Fees mailed Nov. 4, 2010 in re International application No. PCT/US2008/083512.

* cited by examiner

ADAPTIVELY SELECTING SIGNAL CONSTELLATIONS FOR MULTI-CARRIER EDGE

BACKGROUND

The present invention relates generally to wireless devices, and more particularly to wireless devices compatible with Evolved-EDGE networks.

EDGE (Enhanced Data Rates for GSM Evolution) is a wireless network protocol that provides increased capacity, data transmission rates, and/or data transmission reliability over conventional GSM networks. EDGE uses the same TDMA frame structure, logical channel, and 200 kHz carrier bandwidth as GSM. Thus, in most instances, implementing EDGE requires a simple upgrade to an existing GSM network.

EDGE was initially introduced in the United States in 2003, and quickly gained in popularity. As of May 2007, 223 commercial GSM/EDGE networks exist in 113 countries, out of 287 mobile network operator commitments in 142 countries (source: Global mobile Suppliers Association). While EDGE provides improved performance over conventional GSM, e.g., data speeds up to 200 kb/s, further improvements to EDGE, known as "Evolved-EDGE," are currently under development by the 3rd-Generation Partnership Project (3GPP). (For details, see 3GPP TR 45.912, "Feasibility study for evolved GSM/EDGE Radio Access Network (GERAN)," v. 7.2.0, Mar. 20, 2007, available as of the filing date of the present application at www.3gpp.org/FTP/Specs/html-info/45912.htm, hereinafter referred to as "Evolved-EDGE Feasibility Study.") With enhancements including receiver diversity, higher-order modulation, and a new dual-carrier mode, Evolved-EDGE promises data rates exceeding 1 Mb/second in some circumstances.

Because Evolved-EDGE also uses the same TDMA frame structure, logical channels, and carrier bandwidth as GSM networks, Evolved-EDGE may also be easily implemented on existing GSM networks. However, current wireless transceivers are not fully compatible with GSM, EDGE, and Evolved-EDGE networks. Thus, there remains a need for a more versatile wireless transceiver.

SUMMARY

The present invention comprises a transmitting wireless communication device and method, and a corresponding receiving wireless communication device and method that selectively switch between a single-frequency mode, such as appropriate for EDGE networks, and a multiple-frequency mode, such as appropriate for multi-carrier EDGE, e.g., Evolved-EDGE networks. In the single-frequency mode, data is transmitted or received as a single-frequency signal over a single frequency channel. In the multiple-frequency mode, data is transmitted or received as a multiple-frequency signal over multiple adjacent frequency channels. The transmitter selectively switches between a single-channel mapping unit and a multi-channel mapping unit, while the receiver similarly switches between a single-channel demodulator and a multi-channel demodulator. During the single-frequency mode, the single-channel mapping unit modulates input data to output a modulated data stream for the single frequency channel, while the single-channel demodulator demodulates the data received via the single frequency channel. During the multiple-frequency mode, the multi-channel mapping unit modulates the input data to output a modulated data stream for each of the multiple adjacent frequency channels that, when combined, produce a multiple-frequency signal with reduced peak-to-average ratio. The multi-channel demodulator correspondingly demodulates the received multiple-frequency signal received via the multiple adjacent frequency channels.

Exemplary embodiments of the invention include a wireless transmission method. The method comprises selecting between a single-frequency mode and a multiple-frequency mode; transmitting input data as a single-frequency signal over a single frequency channel during the single-frequency mode; modulating the input data during the single-frequency mode to output a modulated data stream for the single frequency channel; transmitting the input data as a multiple-frequency signal over multiple adjacent frequency channels during the multiple-frequency mode; modulating the input data during the multiple-frequency mode to output a modulated data stream for each of the multiple adjacent frequency channels.

In one exemplary method, modulating the input data during the multiple-frequency mode comprises modulating the input data during the multiple-frequency mode to reduce a peak-to-average ratio of the multiple-frequency signal.

In one exemplary method, modulating the input data during the multiple-frequency mode comprises applying a different constellation transform to the input data associated with different frequency channels.

In one exemplary method, applying different constellation transforms to the input data associated with the different frequency channels comprises applying a first set of constellation points to the input data associated with a first frequency channel, and applying a second set of constellation points rotationally offset from the first set of constellation points to the input data associated with an adjacent second frequency channel.

In one exemplary method, applying different constellation transforms to the input data associated with the different frequency channels comprises jointly selecting different first and second sets of constellation points for the input data associated with respective first and second adjacent frequency channels based on an expected peak-to-average ratio of the multiple-frequency signal; and applying the jointly selected first and second sets of constellation points to the input data associated with the respective first and second adjacent frequency channels.

In one exemplary method, modulating the input data during the multiple-frequency mode comprises applying the same constellation transform at different times to the input data associated with different frequency channels.

The exemplary method may further comprise during the single-frequency mode, filtering the modulated data stream for the single frequency channel using a first pulse-shaping filter having a first filter response; and during the multiple-frequency mode, filtering the plurality of modulated data streams for the multiple adjacent frequency channels using a plurality of second pulse-shaping filters, each associated with one of the multiple adjacent frequency channels and each having a filter response different from the first filter response.

In one exemplary method, selecting the single-frequency mode or the multiple-frequency mode comprises selecting the single-frequency mode or the multiple-frequency mode based on an availability of two or more of the multiple adjacent frequency channels.

In one exemplary method, the single-frequency mode comprises an EDGE mode and the multiple-frequency mode comprises a multi-carrier EDGE mode.

Exemplary embodiments of the present invention also include a wireless communication device comprising a transmitter to transmit input data as a single-frequency signal over a single frequency channel during a single-frequency mode or as a multiple-frequency signal over multiple adjacent frequency channels during a multiple-frequency mode, said transmitter comprising: a controller to select between the single-frequency mode and the multiple frequency mode; a single-channel mapping unit to modulate the input data during the single-frequency mode to output a modulated data stream for the single frequency channel; and a multi-channel mapping unit to modulate the input data during the multiple-frequency mode to output a modulated data stream for each of the multiple adjacent frequency channels.

In one exemplary wireless communication device, the multi-channel mapping unit modulates the input data during the multiple-frequency mode so as to reduce a peak-to-average ratio of the multiple-frequency signal.

In one exemplary wireless communication device, the multi-channel mapping unit comprises a plurality of independent modulators that each apply a different constellation transform to the input data associated with different frequency channels.

In one exemplary wireless communication device, constellation points for a first constellation transform applied to the input data associated with a first frequency channel are rotationally offset from constellation points for a second constellation transform applied to the input data associated with an adjacent second frequency channel.

In one exemplary wireless communication device, the controller is further configured to jointly select different first and second sets of constellation points for first and second constellation transforms applied by the multi-channel mapping unit to the input data associated with first and second frequency channels based on an expected peak-to-average ratio of the multiple-frequency signal.

In one exemplary wireless communication device, the multi-channel mapping unit comprises a modulator that applies the same constellation transform at different times to the input data associated with different frequency channels.

The exemplary wireless communication device may further comprise during the single-frequency mode, a first pulse-shaping filter having a first filter response and configured to filter the modulated data stream associated with the single frequency channel; and during the multiple-frequency mode, a plurality of second pulse-shaping filters configured to filter the modulated data streams associated with the multiple adjacent frequency channels, each second pulse-shaping filter associated with one of the multiple adjacent frequency channels and each second pulse-shaping filter having a filter response different from the first filter response.

In one exemplary wireless communication device, the controller selects the single-frequency mode or the multiple-frequency mode based on an availability of two or more of the adjacent frequency channels.

In one exemplary wireless communication device, the single-frequency mode comprises an EDGE mode and the multiple-frequency mode comprises a multi-carrier EDGE mode.

Exemplary embodiments of the present invention also include a wireless reception method comprising selecting between a single-frequency mode and a multiple frequency mode; receiving a single-frequency signal via a single frequency channel during the single-frequency mode; demodulating the single-frequency signal during the single-frequency mode using a single-frequency demodulation protocol; receiving a multiple-frequency signal via multiple adjacent frequency channels during the multiple-frequency mode; and demodulating the multiple-frequency signal during the multiple-frequency mode using a multiple-frequency demodulation protocol.

In one exemplary method, demodulating the multiple-frequency signal comprises applying different constellation transforms to data symbols of the multiple-frequency signal associated with each of the multiple adjacent frequency channels.

In one exemplary method, constellation points for a first constellation transform associated with a first carrier frequency are rotationally offset from constellation points for a second constellation transform associated with a second carrier frequency.

In one exemplary method, demodulating the multiple-frequency signal comprises applying the same constellation transform at different times to data symbols of the multiple-frequency signal associated with each of the multiple adjacent frequency channels.

The exemplary method may further comprise during the single-frequency mode, filtering the single-frequency signal using a first pulse-shaping filter having a first filter response; and during the multiple-frequency mode, filtering the multiple-frequency signal using a plurality of second pulse-shaping filters, each second pulse-shaping filter associated with one of the multiple adjacent frequency channels and each second pulse-shaping filter having a filter response different from the first filter response.

In one exemplary method, the single-frequency mode comprises an EDGE mode and the multiple-frequency mode comprises a multi-carrier EDGE mode.

Exemplary embodiments of the present invention also include a wireless communication device comprising a receiver to receive wireless signals in a single-frequency mode or a multiple-frequency mode, wherein the single-frequency mode receives a single-frequency signal via a single frequency channel and the multiple-frequency mode receives a multiple-frequency signal via multiple adjacent frequency channels, said receiver comprising: a controller to select between the single-frequency mode and the multiple frequency mode; a single-channel demodulator to demodulate the single-frequency signal during the single-frequency mode using a single-frequency demodulation protocol; and a multi-channel demodulator to demodulate the multiple frequency signal during the multiple-frequency mode using a multiple-frequency demodulation protocol.

In one exemplary wireless communication device, the multi-channel demodulator comprises a plurality of independent demodulators that apply different constellation transforms to data symbols of the multiple-frequency signal associated with each of the multiple adjacent frequency channels.

In one exemplary wireless communication device, constellation points for a first constellation transform associated with a first frequency channel are rotationally offset from constellation points for a second constellation transform associated with a second frequency channel.

In one exemplary wireless communication device, the multi-channel demodulator is configured to apply the same constellation transform at different times to the data symbols of the multiple-frequency signal associated with each of the multiple adjacent frequency channels.

The exemplary wireless communication device may further comprise during the single-frequency mode, a first pulse-shaping filter having a first filter response to filter the received single-frequency signal; and during the multiple-frequency mode, a plurality of second pulse-shaping filters to filter the received multiple-frequency signal, each second pulse-shaping filter associated with one of the multiple adjacent frequency channels and each second pulse-shaping filter having a filter response different from the first filter response.

In one exemplary wireless communication device, the single-frequency mode comprises an EDGE mode and the multiple-frequency mode comprises a multi-carrier EDGE mode.

DETAILED DESCRIPTION

Figure 1:
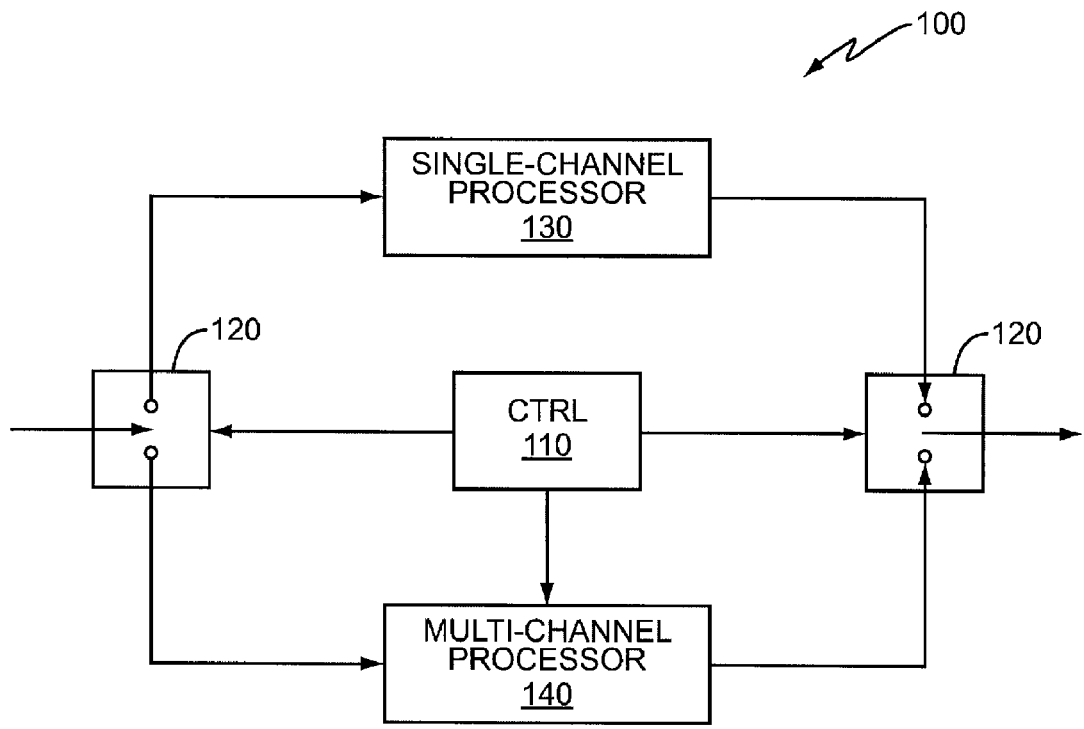
FIG. 1 shows an exemplary dual-mode processor according to one embodiment of the present invention.

FIG. 1 shows an exemplary dual-mode processor 100 according to one embodiment of the present invention. The dual-mode processor 100 may be implemented in a base station and/or a mobile station. Further, the dual-mode processor 100 may be part of a transmitter and/or a receiver.

Dual-mode processor 100 comprises a controller 110, two inter-dependent logical elements 120, single-channel processor 130, and a multi-channel processor 140. Controller 110 selectively configures the dual-mode processor 100 to operate in either a single-frequency mode or a multiple-frequency mode. When the dual-mode processor 100 operates in the single-frequency mode, controller 110 configures the logical elements 120 to connect to the single-channel processor 130, which processes data symbols received or transmitted over a single frequency channel. When the dual-mode processor 100 operates in the multiple-frequency mode, controller 110 configures the logical elements 120 to connect to the multi-channel processor 140, which processes data symbols received or transmitted over two or more adjacent frequency channels.

Figure 2:
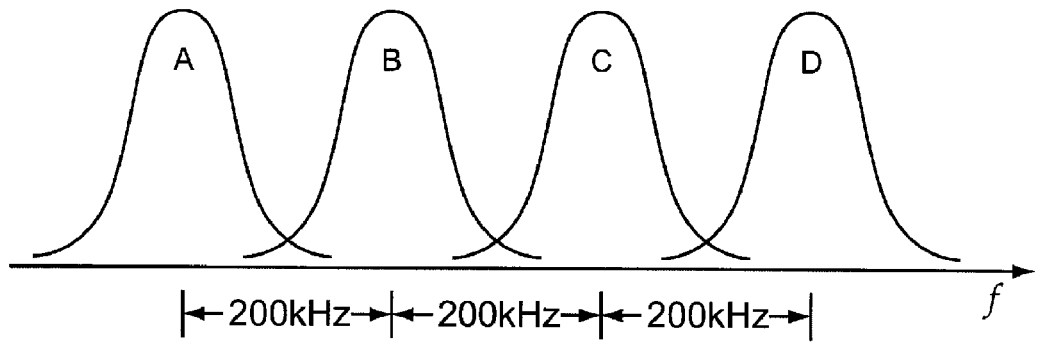
FIG. 2 shows a frequency plot of adjacent frequency bands for operation in the multiple-frequency mode.

FIG. 2 shows exemplary adjacent frequency channels (channels A-D) separated by 200 kHz. In one embodiment, the multi-channel processor 140 processes data symbols received or transmitted over multiple adjacent frequency channels to improve the bit error rate. The present invention may achieve the bit error rate improvement by, for example, reducing a peak-to-average ratio associated with the multiple-frequency transmission signal and/or reducing cross-channel interference caused by the adjacent channels transporting data symbols having the same or similar modulation and power level.

Figure 3:
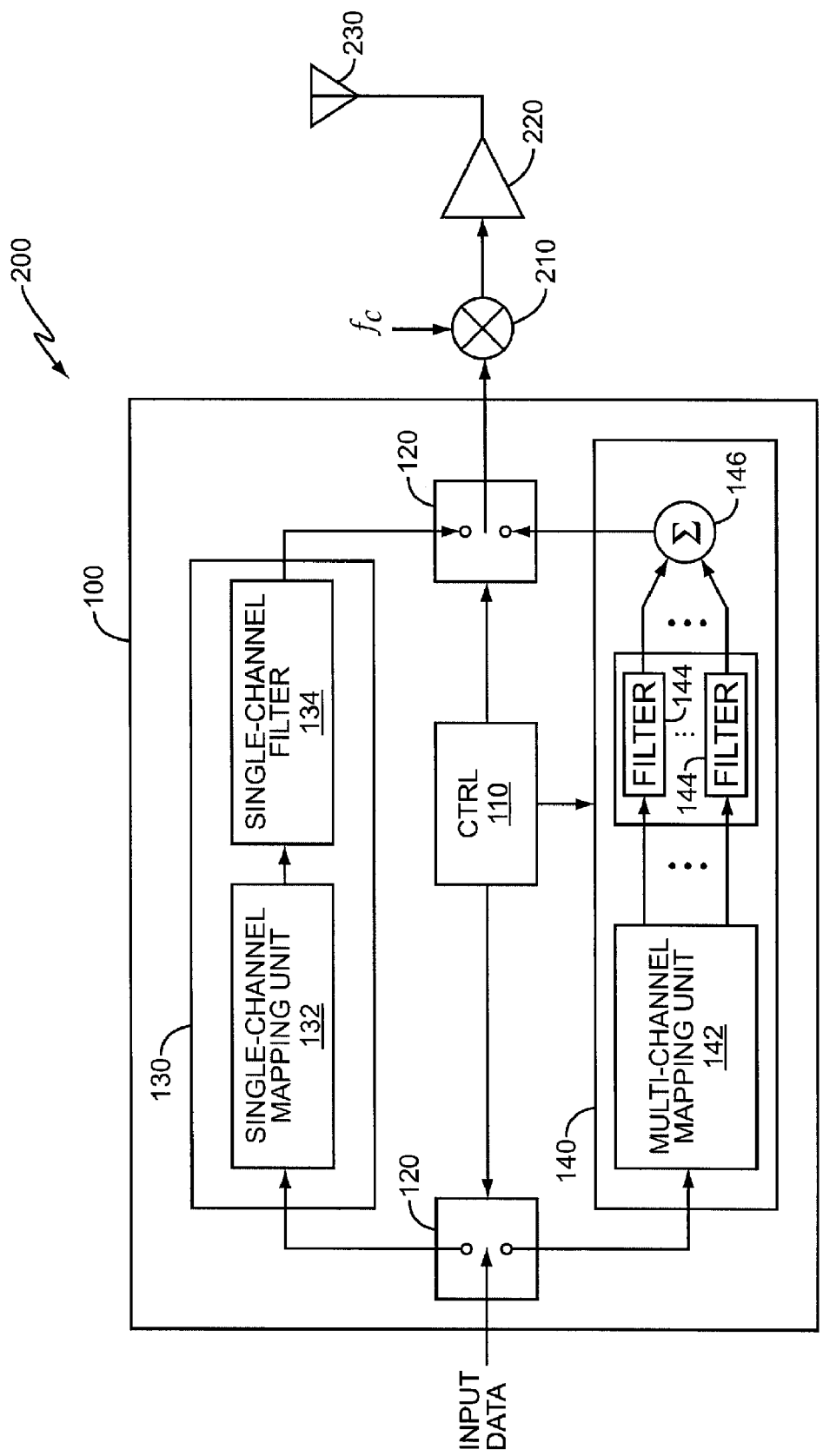
FIG. 3 shows an exemplary wireless transmitter according to one embodiment of the present invention.

The dual-mode processor 100 may be part of a transmitter or a receiver. FIG. 3 shows an exemplary transmitter 200 comprising the dual-mode processor 100, a mixer 210, an amplifier 220, and an antenna 230. The dual-mode processor 100 for the transmitter 200 of FIG. 3 generates data symbols for transmission over one or more frequency channels to a remote device, e.g., a remote base station or mobile station. Mixer 210 up-converts the data symbols output by the dual-mode processor 100 to a desired transmission frequency. Amplifier 220 amplifies the up-converted data symbols to a desired transmission power for transmission via antenna 230.

The single-channel processor 130 for the transmitter 200 comprises a single-channel mapping unit 132 and a pulse-shaping filter 134. Single-channel mapping unit 132 modulates the input data to generate modulated data symbols, as discussed further below. The pulse-shaping filter 134 filters the modulated data symbols for transmission to a remote device via a single frequency channel. The multi-channel processor 140 for the transmitter embodiment comprises a multi-channel modulator 142, a plurality of pulse-shaping filters 144, and a combiner 146. Multi-channel modulator 142 modulates the input data to generate modulated data symbols for each of the multiple adjacent frequency channels being used during the multiple-frequency mode, as discussed further below. Each of the pulse-shaping filters 144 filter the modulated data symbols associated with a corresponding frequency channel. Each filter 144 has a different pulse-shaping filter response than the filter response of the pulse-shaping filter 134 used in the single-channel processor 130. Combiner 146 combines the filtered data symbols to generate a combined signal for up-conversion, amplification, and transmission to a remote device via two or more adjacent frequency channels.

Figure 4:
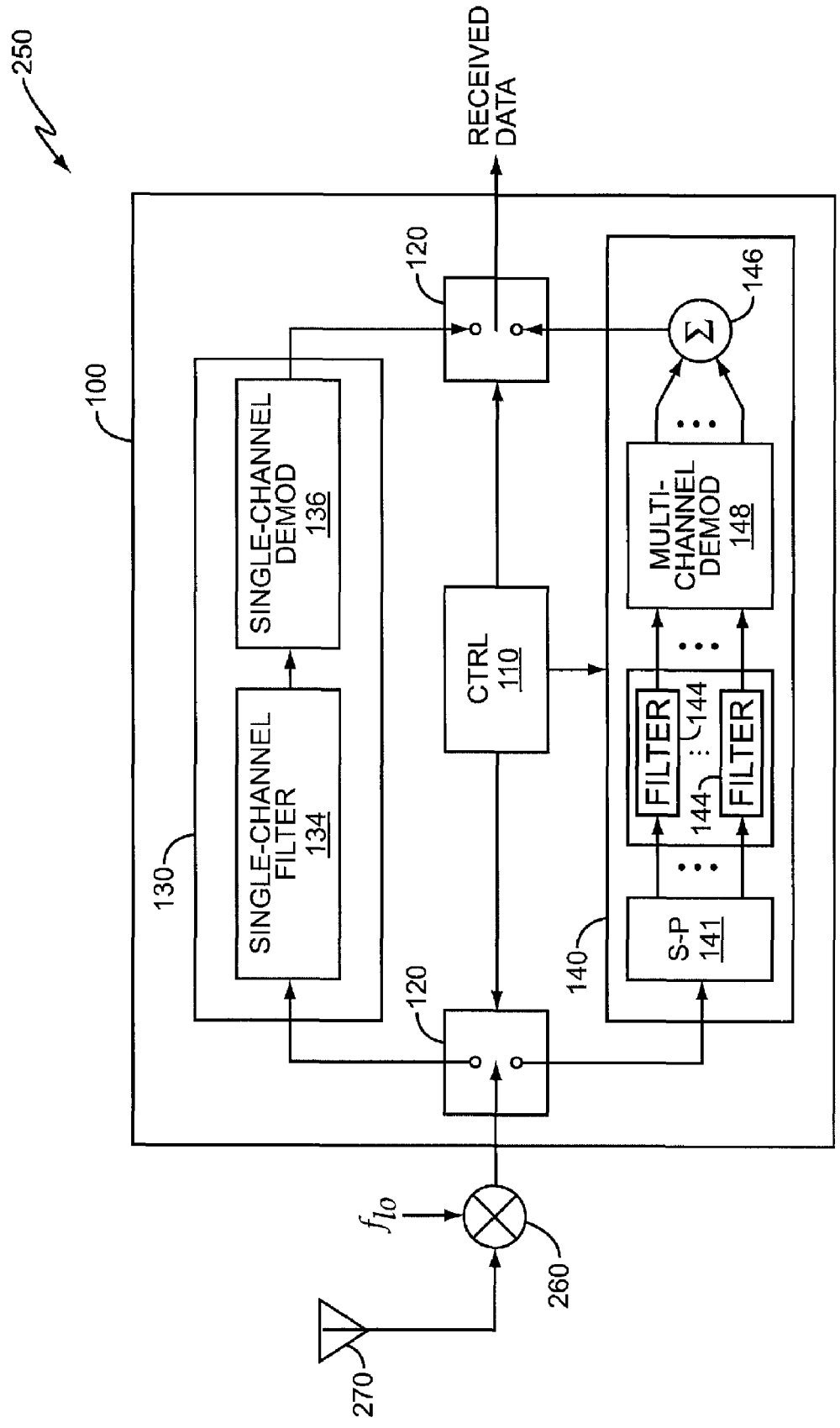
FIG. 4 shows an exemplary wireless receiver according to one embodiment of the present invention.

FIG. 4 shows an exemplary receiver 250 comprising dual-mode processor 100, a mixer 260, and an antenna 270. Mixer 260 down-converts the data symbols received over one or more frequency channels from a remote device via antenna 270. The dual-mode processor 100 for the receiver 250 of FIG. 4 processes the received data to reproduce the transmitter input data.

The single-channel processor 130 for the receiver embodiment comprises a pulse-shaping filter 134 and a single-channel demodulator 136. Pulse-shaping filter 134 filters the received data symbols. The filter response of the pulse-shaping filter 134 generally matches the filter response of the pulse-shaping 134 in transmitter 200. Single-channel demodulator 136 demodulates the filtered data symbols to reproduce the transmitter input data.

The multi-channel processor 140 of the receiver embodiment comprises a serial-to-parallel converter 141, a plurality of pulse-shaping filters 144, a multi-channel demodulator 148, and a combiner 146. The serial-to-parallel converter 141 converts the received signal into N data streams, one for each adjacent frequency channel. Each pulse-shaping filter 144 has a filter response different from the filter response of the pulse-shaping filter 134 in the single-channel processor 130, and that filters received data symbols associated with a corresponding frequency channel. The filter response of each pulse-shaping filter 144 in the multi-channel processor 140 of the receiver 250 generally matches the filter response of the corresponding pulse-shaping filter 144 in the multi-channel processor 140 of the transmitter 200. Multi-channel demodulator 148 demodulates the filtered data symbols for each of the two or more adjacent frequency channels. Combiner 146 combines the demodulated data to generate a combined signal output representative of the transmit data.

The pulse-shaping filters 144 of the multi-channel processors 140 in both the transmitter 200 and receiver 250 comprise interference-rejecting pulse-shaping filters 144 that have a filter response specially designed to reduce cross-channel interference caused by the data symbols in the adjacent frequency channels that have the same or similar power level and modulation. In conventional EDGE and GSM systems, receiving two adjacent frequency channels simultaneously causes adjacent channel interference (ACI) that will significantly reduce the achievable data rate on either channel. According to the present invention, when operating in a multiple-frequency mode, e.g., a multi-carrier EDGE mode, the controller 110 may jointly chose a set of pulse-shaping filters 144 to minimize the ACI, or to otherwise constrain the ACI in a known manner that may be utilized by the receiver 250. One approach is to choose pulse-shaping filters 144 that correspond to a cosine-modulated filter bank (CMFB). Certain CMFBs, such as quadrature mirror filters (QMFs), have the desirable property of canceling interference or aliasing between the two or more adjacent frequency channels when the same CMFB is used in both the transmitter 200 and the receiver 250. Other cosine-modulated filters, such as pseudo-QMF filters, cancel aliasing in two or more adjacent frequency channels in the transmitter 200 and/or receiver 250.

The single-channel and multi-channel mapping units 132, 142 modulate the input data to generate modulated data streams for the single-frequency and multiple-frequency modes, respectively. The single-channel mapping unit 132 may use any known modulation protocol, such as that used by EDGE networks, to modulate the input data. The multi-channel mapping unit 142 modulates the input data corresponding to the adjacent frequency channels. In some instances, such modulated data streams may add constructively at the combiner 146, which increases the peak-to-average ratio (PAR) of the combined multiple-frequency signal output by the combiner 146. When the PAR of the multiple-frequency signal exceeds the linear operating range of the power amplifier 220, the transmitted multiple-frequency signal may encounter more distortion, and therefore, have a degraded bit error rate. To address this problem, the present invention uses digital modulation techniques to reduce the PAR of the multiple-frequency signal that results when the modulated data streams for each adjacent frequency channel are combined by combiner 146.

Figure 5A:
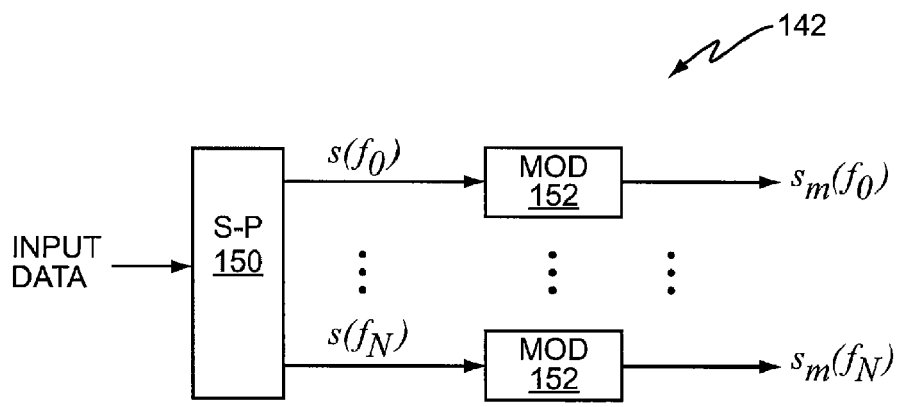
FIGS. 5a and 5b show a multi-channel mapping unit and demodulator according to one exemplary embodiment of the present invention.
Figure 5B:
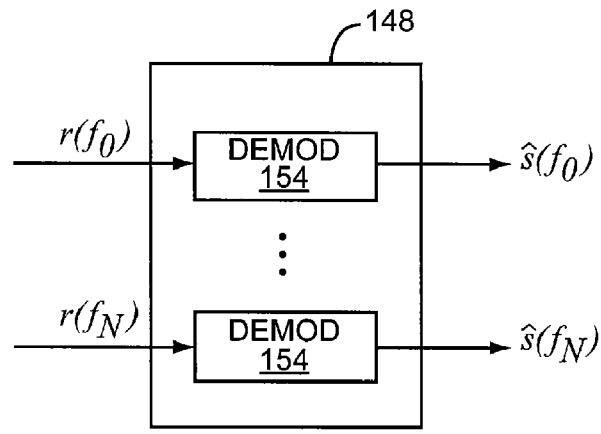

FIGS. 5a and 5b show a multi-channel mapping unit 142 and multi-channel demodulation unit 148 for one exemplary embodiment. For this embodiment, the multi-channel mapping unit 142 comprises a serial-to-parallel converter 150 and a plurality of modulators 152, one for each adjacent frequency channel. The serial-to-parallel converter 150 converts the input data into N data streams $s(f_0) \ldots s(f_N)$, one for each adjacent frequency channel. Each modulator 152 modulates the input data stream using a different constellation transform to generate the modulated data streams $s_m(f_0) \ldots s_m(f_N)$. The multi-channel demodulation unit 148 comprises a plurality of demodulators 154 that generally correspond to modulators 152. Each demodulator 154 demodulates the input data stream using a different constellation transform defined by the transmitter 200 to reproduce the N data streams $\hat{s}(f_0) \ldots \hat{s}(f_N)$.

Figure 6:
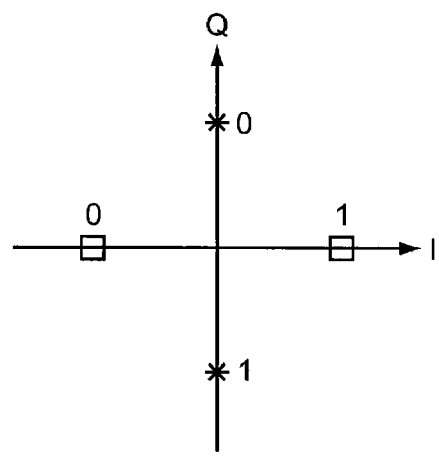
FIG. 6 shows exemplary constellation points for multiple constellation transforms used by the multi-channel mapping unit for one exemplary embodiment.

The constellation transform used by each modulator 152 and demodulator 154 is chosen to reduce the constructive combining of the modulated data streams, and therefore, to reduce the PAR of the multiple-frequency signal output by combiner 146. In one exemplary embodiment, the constellation transforms used by each modulator 152 and demodulator 154 are rotationally offset from each other. For example, the squares in FIG. 6 show constellation points for a for a binary phase-shift keyed (BPSK) constellation transform used for one carrier frequency, e.g., $f_0$, and the stars show constellation points for a constellation transform used for a different carrier frequency, e.g., $f_N$. By using such phase offset constellation points, the resulting modulated data streams do not constructively combine at combiner 146.

In another exemplary embodiment, the constellation transforms used by the modulators 152 may be jointly selected by the controller 110 to minimize the constructive addition at the combiner 146. For this embodiment, the controller 110 analyzes the constellation points in one or more constellation transforms to identify the subsets of constellation points that produce either a best or an acceptable PAR at the combiner output. The transforms selected by controller 110 may be applied to a plurality of symbols in each of the time-domain data frame or timeslots transmitted on the respective carrier frequencies. For example, if a data frame transmitted on carrier frequency $f_1$ contains one-hundred data symbols, controller 110 may select one transform to use on the first fifty symbols of that frame and a second transform to use on the remaining fifty symbols of that frame. In addition, the controller 110 may select a complementary pair of transforms to use sequentially on the 100-symbol data frame transmitted contemporaneously on carrier frequency $f_2$. The transmitter may inform the receiver of the selected transform(s), e.g., by sending indicia of the selected transform(s) to the receiver. The indicia may be sent to the receiver generally contemporaneously with the data frame to which the transform(s) were applied. Alternatively, the receiver may detect the selected transform(s) directly from the received signal.

Figure 7A:
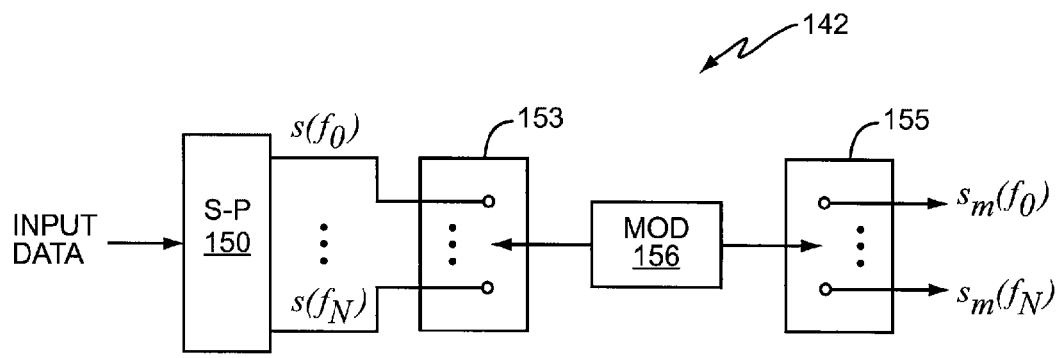
FIGS. 7a and 7b show a multi-channel mapping unit and demodulator according to another exemplary embodiment of the present invention.
Figure 7B:
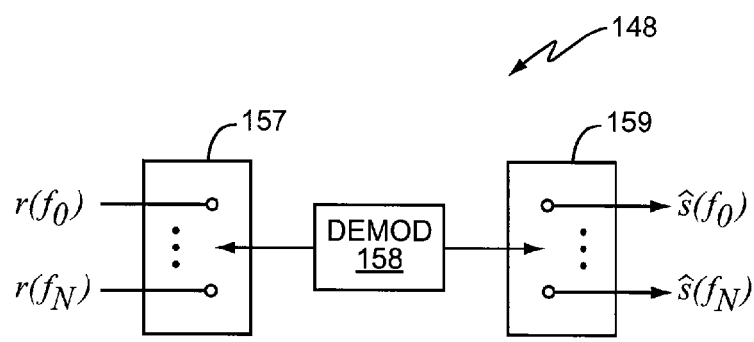

FIGS. 7a and 7b show a multi-channel mapping unit 142 and multi-channel demodulation unit 148 for another exemplary embodiment. For this embodiment, the multi-channel mapping unit 142 comprises serial-to-parallel converter 150, logical switches 153, 155, and modulator 156. The serial-to-parallel converter 150 converts the input data into N data streams $s(f_0) \ldots s(f_N)$, one for each adjacent frequency channel. Switch 153 periodically selects each of the N data streams, one at a time, for input to the modulator 156 to offset the timing of the modulation operation by some desired amount, e.g., $1/N^{th}$ of a symbol period for N carriers. This prevents the data streams associated with different carrier frequencies from encountering the same constellation point at the same time. Modulator 156 modulates each input data stream at a different time using the same constellation transform to generate the modulated data streams $s_m(f_0) \ldots s_m(f_N)$. Switch 155, which is synchronized with switch 153, periodically connects the modulator output to a different output of the multi-channel mapping unit 142. Because the timing of the modulation process applied to different data streams is offset, the resulting modulated data streams do not combine constructively at the combiner 146.

The multi-channel demodulation unit 148 comprises logical switches 157, 159 and a demodulator 158 that generally corresponds to the modulator 156. Thus, the multi-channel demodulation unit 148 mirrors the operation of the multi-channel mapping unit 142 of FIG. 7a. More particularly, switch 157 periodically selects each of the N input data streams, one at a time, for input to the demodulator 158 to offset the timing of the demodulation operation by some desired amount, e.g., $1/N^{th}$ of a symbol period. Demodulator 158 demodulates each input data stream at a different time using the same constellation transform to generate the demodulated data streams $\hat{s}_m(f_0) \ldots \hat{s}_m(f_N)$. Switch 159, which is synchronized with switch 157, periodically ties the demodulator output to a different output of the multi-channel demodulation unit 148.

The controller 110 in both the transmitter 200 and receiver 250 dynamically configures dual-mode processor 100 for operation in either the single-frequency mode or the multiple-frequency mode. Controller 110 may select either the single-frequency mode or the multiple-frequency mode depending on the availability of one or more frequency channels within the system bandwidth. For example, if frequency channels B and C of FIG. 2 are available, but frequency channel A and/or frequency channel D are currently being used by another wireless device, controller 110 may select the single-frequency mode. Alternatively, the controller 110 may select channels B and C for the multiple-frequency mode while ensuring that the selected multiple-frequency mode does not produce signals causing undue interference with the channels being used by other wireless devices. If all four frequency channels are available, controller 110 may select channels B and C for the multiple-frequency mode.

Transmitter 200 and receiver 250 work together to configure the dual-mode processor 100 in the appropriate mode. In one embodiment, the transmitter 200 and receiver 250 may exchange information identifying the current operating mode to ensure that both entities operate in the same mode. For example, a transmitter 200 in a base station may query the receiver 250 in a mobile station. Based on the response to the query, the transmitter 200 and receiver 250 configure the dual-mode processors 100 for the appropriate operating mode. Either the transmitter 200 or receiver 250 may request a mode switch, e.g., from the single-frequency mode to the multiple-frequency mode. If the capability is unidirectional, e.g., downlink or uplink only, the request may be initiated by the transmitting entity, e.g., the base station, or the request may be initiated by the receiving entity, e.g., the mobile station. The response to the request or the subsequent negotiation messages may include timing or other information necessary to define properties of the selected operating mode and to make a smooth transition between the single-frequency and multiple-frequency modes. Similarly, messages directing the transmitter 200 and receiver 250 to return to the single-frequency mode may be used.

The controller 110 in either the transmitter 200 and/or receiver 250 may define multiple properties of the selected operating mode, e.g., the number of adjacent frequency channels potentially available for the multiple-frequency mode, the number of adjacent frequency channels being used in the multiple-frequency mode, the filter response of the pulse-shaping filters 144 in the multi-channel processor 140, etc. For example, controller 110 may increase the number of adjacent frequency channels potentially available for the multiple-frequency mode, and therefore the achievable data rate, by decreasing the channel spacing within a system bandwidth. For example, transmitter 200 and receiver 250 may be designed to accommodate seven 200 kHz frequency channels within a 1.4 MHz system bandwidth. Controller 110 may increase the data rate by decreasing the channel spacing to 150 kHz, and therefore increasing the number of adjacent frequency channels potentially available for the multiple-frequency mode. By decreasing the channel spacing to 150 kHz and designing the filter response of the filters 144 accordingly, transmitter 200 and receiver 250 may accommodate up to nine frequency channels within the 1.4 MHz system bandwidth. This may provide a 30% increase in aggregate data rate over the data rate achievable with a 200 kHz channel spacing.

Controller 110 may also select the number of adjacent frequency channels used during the multiple-frequency mode based on the current channel conditions. For example, when the channel conditions are favorable, the controller 110 may select a large number of adjacent frequency channels, e.g., seven adjacent frequency channels. When channel conditions are poor, controller 110 may select a small number of adjacent frequency channels, e.g., two adjacent frequency channels. The controller 110 may obtain and evaluate the channel conditions using any known means. For example, a mobile station may determine the channel conditions, e.g., by measuring the carrier-to-interference ratio, and send the determined channel conditions to the base station. The base station subsequently selects the number of adjacent frequency channels, and may select the adjacent channel spacing, based on the received channel conditions. Alternatively, the base station may directly determine the channel conditions and select the number and/or channel spacing of the adjacent frequency channels based on the determined channel conditions.

In some embodiments, the controller 110 may also select the filter response for the filters 144 of the multi-channel processor 140. In one exemplary embodiment, the controller 110 selects the filter response for the pulse-shaping filters 144 to account for expected interference conditions. To that end, the controller 110 may consider the channel spacing, e.g., 150 kHz, 200 kHz, etc., and/or the number of adjacent frequency channels used during the multiple-frequency mode. For example, the controller 110 may select a particular filter response for each of the filters 144 that reduces cross-channel interference arising from data symbols transmitted or received via five adjacent frequency channels spaced by 150 kHz. The controller 110 may select a different filter response for each of the filters 144 when the multiple-frequency mode accommodates a different number of frequency channels and/or channel spacing, e.g., five adjacent frequency channels spaced by 200 kHz, three adjacent frequency channels spaced by 150 kHz, etc.

The present invention provides a dual-mode processor 100 for a transmitter 200 and/or receiver 250 that is compatible with both EDGE and multi-carrier EDGE network protocols. Furthermore, the dual-mode processor 100 of the present invention may dynamically switch between the single-frequency mode associated with the EDGE network protocol and the multiple-frequency mode associated with the multi-carrier EDGE network protocol to provide optimal wireless communication performance. In addition, the data rate capacity may be further expanded by using the dual-mode processor 100 in more advanced receivers.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A wireless TDMA transmission method comprising:
  selecting between a single-frequency mode and a multiple-frequency mode having multiple adjacent TDMA frequency channels based on an availability of two or more of the multiple adjacent TDMA frequency channels;
  transmitting input data as a single-frequency signal over a single frequency channel during the single-frequency mode;
  modulating the input data during the single-frequency mode to output a modulated data stream for the single frequency channel using a single-frequency modulation protocol;
  transmitting the input data as a multiple-frequency signal over multiple adjacent TDMA frequency channels during the multiple-frequency mode; and
  modulating the input data during the multiple-frequency mode to output a modulated data stream for each of the multiple adjacent TDMA frequency channels using a multiple-frequency modulation protocol.

2. The method of claim 1 wherein modulating the input data during the multiple-frequency mode comprises modulating the input data during the multiple-frequency mode using the multiple-frequency modulation protocol to reduce a peak-to-average ratio of the multiple-frequency signal.

3. The method of claim 1 wherein modulating the input data during the multiple-frequency mode comprises applying a different constellation transform to the input data associated with different TDMA frequency channels.

4. The method of claim 3 wherein applying different constellation transforms to the input data associated with the different TDMA frequency channels comprises applying a first set of constellation points to the input data associated with a first frequency channel, and applying a second set of constellation points rotationally offset from the first set of constellation points to the input data associated with an adjacent second frequency channel.

5. The method of claim 3 wherein applying different constellation transforms to the input data associated with the different TDMA frequency channels comprises:
    jointly selecting different first and second sets of constellation points for the input data associated with respective first and second adjacent TDMA frequency channels based on an expected peak-to-average ratio of the multiple-frequency signal; and
    applying the jointly selected first and second sets of constellation points to the input data associated with the respective first and second adjacent TDMA frequency channels.

6. The method of claim 1 wherein modulating the input data during the multiple-frequency mode comprises applying the same constellation transform at different times to the input data associated with different TDMA frequency channels.

7. The method of claim 1 further comprising
    during the single-frequency mode, filtering the modulated data stream for the single frequency channel using a first pulse-shaping filter having a first filter response; and
    during the multiple-frequency mode, filtering the plurality of modulated data streams for the multiple adjacent TDMA frequency channels using a plurality of second pulse-shaping filters, each associated with one of the multiple adjacent TDMA frequency channels and each having a filter response different from the first filter response.

8. The method of claim 1 wherein the single-frequency mode comprises an EDGE mode and the multiple-frequency mode comprises a multi-carrier EDGE mode.

9. A wireless communication device comprising:
    a TDMA transmitter to transmit input data as a single-frequency signal over a single frequency channel during a single-frequency mode or as a multiple-frequency signal over multiple adjacent TDMA frequency channels during a multiple-frequency mode, said transmitter comprising:
        a controller to select between the single-frequency mode and the multiple frequency mode based on an availability of two or more of the multiple adjacent TDMA frequency channels;
        a single-channel mapping unit to modulate the input data during the single-frequency mode using a single-frequency modulation protocol to output a modulated data stream for the single frequency channel; and
        a multi-channel mapping unit to modulate the input data during the multiple-frequency mode using a multiple-frequency modulation protocol to output a modulated data stream for each of the multiple adjacent TDMA frequency channels.

10. The wireless communication device of claim 9 wherein the multi-channel mapping unit modulates the input data during the multiple-frequency mode so as to reduce a peak-to-average ratio of the multiple-frequency signal.

11. The wireless communication device of claim 9 wherein the multi-channel mapping unit comprises a plurality of independent modulators that each apply a different constellation transform to the input data associated with different TDMA frequency channels.

12. The wireless communication device of claim 11 wherein constellation points for a first constellation transform applied to the input data associated with a first TDMA frequency channel are rotationally offset from constellation points for a second constellation transform applied to the input data associated with an adjacent second TDMA frequency channel.

13. The wireless communication device of claim 11 wherein the controller is further configured to jointly select different first and second sets of constellation points for first and second constellation transforms applied by the multi-channel mapping unit to the input data associated with first and second TDMA frequency channels based on an expected peak-to-average ratio of the multiple-frequency signal.

14. The wireless communication device of claim 9 wherein the multi-channel mapping unit comprises a modulator that applies the same constellation transform at different times to the input data associated with different TDMA frequency channels.

15. The wireless communication device of claim 9 further comprising:
    during the single-frequency mode, a first pulse-shaping filter having a first filter response and configured to filter the modulated data stream associated with the single frequency channel; and
    during the multiple-frequency mode, a plurality of second pulse-shaping filters configured to filter the modulated data streams associated with the multiple adjacent TDMA frequency channels, each second pulse-shaping filter associated with one of the multiple adjacent TDMA frequency channels and each second pulse-shaping filter having a filter response different from the first filter response.

16. The wireless communication device of claim 9 wherein the single-frequency mode comprises an EDGE mode and the multiple-frequency mode comprises a multi-carrier EDGE mode.

17. A wireless TDMA reception method comprising:
    selecting between a single-frequency mode and a multiple frequency mode having multiple adjacent TDMA frequency channels responsive to an availability of two or more of the multiple adjacent TDMA frequency channels indicated by a corresponding transmitter;
    receiving a single-frequency signal via a single frequency channel during the single-frequency mode;
    demodulating the single-frequency signal during the single-frequency mode using a single-frequency demodulation protocol;
    receiving a multiple-frequency signal via multiple adjacent TDMA frequency channels during the multiple-frequency mode; and
    demodulating the multiple-frequency signal during the multiple-frequency mode using a multiple-frequency demodulation protocol.

18. The method of claim 17 wherein demodulating the multiple-frequency signal comprises applying different constellation transforms to data symbols of the multiple-frequency signal associated with each of the multiple adjacent TDMA frequency channels.

19. The method of claim 18 wherein constellation points for a first constellation transform associated with a first TDMA carrier frequency are rotationally offset from constellation points for a second constellation transform associated with a second TDMA carrier frequency.

20. The method of claim 17 wherein demodulating the multiple-frequency signal comprises applying the same constellation transform at different times to data symbols of the multiple-frequency signal associated with each of the multiple adjacent TDMA frequency channels.

21. The method of claim 17 further comprising
during the single-frequency mode, filtering the single-frequency signal using a first pulse-shaping filter having a first filter response; and
during the multiple-frequency mode, filtering the multiple-frequency signal using a plurality of second pulse-shaping filters, each second pulse-shaping filter associated with one of the multiple adjacent TDMA frequency channels and each second pulse-shaping filter having a filter response different from the first filter response.

22. The method of claim 17 wherein the single-frequency mode comprises an EDGE mode and the multiple-frequency mode comprises a multi-carrier EDGE mode.

23. A wireless communication device comprising:
a TDMA receiver to receive wireless signals in a single-frequency mode or a multiple-frequency mode, wherein the single-frequency mode receives a single-frequency signal via a single frequency channel and the multiple-frequency mode receives a multiple-frequency signal via multiple adjacent TDMA frequency channels, said receiver comprising:
a controller to select between the single-frequency mode and the multiple frequency mode responsive to an availability of two or more of the multiple adjacent TDMA frequency channels indicated by a corresponding transmitter;
a single-channel demodulator to demodulate the single-frequency signal during the single-frequency mode using a single-frequency demodulation protocol; and
a multi-channel demodulator to demodulate the multiple frequency signal during the multiple-frequency mode using a multiple-frequency demodulation protocol.

24. The wireless communication device of claim 23 wherein the multi-channel demodulator comprises a plurality of independent demodulators that apply different constellation transforms to data symbols of the multiple-frequency signal associated with each of the multiple adjacent TDMA frequency channels.

25. The wireless communication device of claim 24 wherein constellation points for a first constellation transform associated with a first TDMA frequency channel are rotationally offset from constellation points for a second constellation transform associated with a second TDMA frequency channel.

26. The wireless communication device of claim 23 wherein the multi-channel demodulator is configured to apply the same constellation transform at different times to the data symbols of the multiple-frequency signal associated with each of the multiple adjacent TDMA frequency channels.

27. The wireless communication device of claim 23 further comprising
during the single-frequency mode, a first pulse-shaping filter having a first filter response to filter the received single-frequency signal; and
during the multiple-frequency mode, a plurality of second pulse-shaping filters to filter the received multiple-frequency signal, each second pulse-shaping filter associated with one of the multiple adjacent TDMA frequency channels and each second pulse-shaping filter having a filter response different from the first filter response.

28. The wireless communication device of claim 23 wherein the single-frequency mode comprises an EDGE mode and the multiple-frequency mode comprises a multi-carrier EDGE mode.

* * * * *